US009550627B2

(12) United States Patent
Van Den Dungen et al.

(10) Patent No.: US 9,550,627 B2
(45) Date of Patent: Jan. 24, 2017

(54) PRODUCT HOLDER FOR HOLDING FOOD PRODUCTS

(71) Applicant: Marel Townsend Further Processing B.V., Boxmeer (NL)

(72) Inventors: Wilhelmus Johannes Everardus Maria Van Den Dungen, Veghel (NL); Sigebertus Johannes Jacobus Jozef Meggelaars, Eindhoven (NL); Dirk Meskendahl, Kranenburg (DE); Wilhelmus Johannes Jacobus Maria Van Der Straaten, Sambeek (NL)

(73) Assignee: Marel Townsend Further Processing B.V., Boxmeer (NL)

( * ) Notice: Subject to any disclaimer, the term of this patent is extended or adjusted under 35 U.S.C. 154(b) by 0 days.

(21) Appl. No.: 14/437,522

(22) PCT Filed: Oct. 30, 2013

(86) PCT No.: PCT/NL2013/050776
§ 371 (c)(1),
(2) Date: Apr. 22, 2015

(87) PCT Pub. No.: WO2014/070009
PCT Pub. Date: May 8, 2014

(65) Prior Publication Data
US 2015/0259147 A1 Sep. 17, 2015

(30) Foreign Application Priority Data

Oct. 30, 2012 (NL) ...................................... 2009728

(51) Int. Cl.
*B65G 35/08* (2006.01)
*B65G 35/00* (2006.01)
(Continued)

(52) U.S. Cl.
CPC ............. *B65G 17/36* (2013.01); *A22C 11/008* (2013.01); *B65G 17/12* (2013.01); *Y10T 29/49815* (2015.01); *Y10T 29/49826* (2015.01)

(58) Field of Classification Search
CPC ................................ B65G 35/08; B65G 35/00
(Continued)

(56) References Cited

U.S. PATENT DOCUMENTS 1,445,277 A * 2/1923 Hansen .................. B65G 17/36
198/714
4,167,999 A * 9/1979 Haggerty ............. B65G 17/067
198/803.2
(Continued)

FOREIGN PATENT DOCUMENTS

WO 9913729 A2 3/1999

*Primary Examiner* — Douglas Hess
(74) *Attorney, Agent, or Firm* — The Webb Law Firm (57) ABSTRACT

The present invention relates to a product holder (1) for holding food products to be transported through a processing room comprising: a carrier frame (2) having at least a longitudinal support structure and coupling ends connected to opposite sites of the longitudinal support structure; and a container formed by at least one curved contact segment (3a, 3b) for contacting the food products, wherein the at least one curved contact segment is detachably connectable to the carrier frame. The invention further relates to a transporting device comprising the product holder of the present invention and methods for assembling and disassembling the product holder of the present invention.

15 Claims, 7 Drawing Sheets

(51) Int. Cl.
*B65G 17/36* (2006.01)
*A22C 11/00* (2006.01)
*B65G 17/12* (2006.01)

(58) Field of Classification Search
USPC .... 198/465.1, 707, 711, 713, 717, 747, 801, 198/867.01, 867.15; 104/118, 120
See application file for complete search history.

(56) References Cited

U.S. PATENT DOCUMENTS

| | | | | |
|---|---|---|---|---|
| 5,207,140 A * | 5/1993 | Rosen | ............... | B26D 7/018 269/21 |
| 5,988,364 A * | 11/1999 | Boyce | ............... | B41F 17/36 198/867.11 |
| 6,176,370 B1 * | 1/2001 | Davies | ............... | B26D 7/018 198/803.2 |
| 6,471,041 B1 * | 10/2002 | Long | ............... | B65G 17/42 198/699.1 |
| 6,471,042 B1 | 10/2002 | Van De Dungen et al. | | |
| 6,817,284 B2 * | 11/2004 | Zittel | ............... | A23B 4/0053 99/405 |
| 7,360,640 B2 * | 4/2008 | Cash, III | ............ | B65G 15/42 198/699 |
| 7,507,087 B2 * | 3/2009 | Tenzek | ............... | F27B 9/028 198/747 |
| 7,617,924 B2 * | 11/2009 | Han | ............ | H01L 21/67736 198/741 |
| 8,281,917 B1 * | 10/2012 | Bowie | ............... | G01R 31/01 198/346.1 |
| 8,356,710 B2 * | 1/2013 | Roy | ............... | B65G 17/063 198/803.14 |

* cited by examiner

PRODUCT HOLDER FOR HOLDING FOOD PRODUCTS

CROSS-REFERENCE TO RELATED APPLICATIONS

This application is the United States national phase of International Application No. PCT/NL2013/050776 filed Oct. 30, 2013, and claims priority to The Netherlands Patent Application No. 2009728 filed Oct. 30, 2012, the disclosures of which are hereby incorporated in their entirety by reference.

BACKGROUND OF THE INVENTION

Field of the Invention

The present invention relates to a product holder for holding food products to be transported through a processing room, a transporting device for transporting food products to be subjected to a processing, the use of such transporting device and methods for assembling and disassembling a product holder.

Description of Related Art

Plural types of transporting devices for transporting food products are known. The type of food product transporting devices this invention relates to are of the type that enables less stable food products, like not completely cured sausages, to be transported through a processing space where the food products are treated. Such transporting device make use of basket type of product holders to contain the food products such that the environmental conditions can act on the food products from different sides. The acting of the environmental conditions on the food products may for example result in hardening, drying, smoking, salting, coloring, seasoning, heating and/or cooling of the food products. An example of such basket using transporting device is provided in International patent application WO 99/13729.

A general object of the invention is to provide a product holder and a transporting device for transporting food products that results in enhanced transport efficiency and/or that have enhanced possibilities in use.

SUMMARY OF THE INVENTION

The present invention provides a product holder, for holding food products to be transported through a processing room, comprising: a carrier frame comprising at least a longitudinal support structure and at least one coupling; and a container formed by at least one contact segment for contacting the food products, wherein the at least one contact segment is detachably connectable to the carrier frame. The contact segment is detachably connectable to the carrier frame because there is no permanent coupling provided between the at least one contact segment and the longitudinal support structure; for example a welded coupling or coupling means like bolts, nuts, pins, pop rivets, screws and so on are not provided. The coupling is a result of a clamping coupling. The contact segment and the longitudinal support structure are shaped so to be snapped together and also to be uncoupled again by de-snapping them. The coupling is thus a "shape-coupling" that fastens the contact segment and the longitudinal support structure by a clamping force such that the elements can also be released again; e.g. without the need of using tools. So to be able to detachably connect one or more contact segments to the carrier frame both structures may have cooperative shapes, i.e. complementary shapes.

The at least one coupling may comprise one or more connectors or suspensions for coupling the product holder of the present invention to a transporting device. For example the coupling may be provided as coupling ends provided at the opposite sides of the longitudinal support structure. As an alternative one or more couplings may also be provided on other positions over the length of the longitudinal support structure. Yet a further option is to provide the coupling as an integral element of the longitudinal support structure, for instance the ends of the longitudinal support structure may also directly be coupled with one ore more transportation chains; this making the end parts of the longitudinal support structure automatically also the coupling/couplings. As for the coupling to the transporting mechanism such coupling may be a stationary coupling but may also be a rotatable coupling, dependent of the transportation path the product holder has to follow the routing of the transportation mechanism.

The product holder is suited for holding food products that may be selected from: sausages, injected products, assembled food products, portioned food products, meat parts, fishes, fish parts, vegetables, fruits and so on. The food products may be placed in the holder in such a way that the food products are freely moveable, e.g. rotatable, within the holder during the processing of the food product. One of the advantages is that due to the holder formed by at least one contact segment being releasably fastened to the longitudinal support structure, e.g. carrier frame, the feasibility of repair and maintenance of the product holders is now enhanced. In case only one or more product holders is broken, worn-out, damaged or so the present invention enables the possibility to only change container (or a part of the container if plural segments make up the container) while the carrier frame can stay in position. Normally the carrier frame is connected to a larger transporting mechanism that makes it difficult/complex to also exchange the carrier structure. Furthermore only exchanging the container and not the carrier structure is cheaper than changing the whole product holder (the longitudinal carrier together with at least one contact segment). During charging and discharging of food products into and out of the container the wear of the container is normally larger than the wear of the carrier frame. By exchange of the segments the life span of both the container and the carrier frame can be optimized, thus leading to further efficiency and cost savings. A further advantage of the present invention is that the product holders can be adapted during their life time to changing requirements. This is possible by changing for instance the shape, material or other properties of the containers of the product holders. By optimizing the condition of the product holders to the actual demands of use the transportation of food product may further be enhanced. The present invention also enables the construction of product holders that are easy to clean, which is of importance due to the strict requirements in the food processing industry relating to hygiene. A further advantage is that the product holder according the invention also provides the freedom to further optimize its shape leading to for instance the design of a transporting device with enhance capacity and/or smaller dimensions to be able to process more food products. Examples of useful freedom of design of the contact segment(s) is that there is freedom in choice of the size and positioning of any openings that are present is the holder assembled of the contact segment(s). Also protruding elements like for instance bumps or ridges, and apertures such as grooves or slots and so on may be provided in the product holder. Also there is more freedom in choices for the material of the product holder; for instance various polymers may be chosen as construction material. Also the weight of the product holder can thus be influenced.

The movability of the food products during the processing of the food product is achieved by the use of a container formed by one or more contact segments with a contact surface having bends, curves, or angles directed towards the food products. Therefore the product holder of the present invention may also be formed by one or more contact segments with a curved, bent, crooked or angled contact surface directed towards the food products. The product holder of the present invention may also be formed by one or more contact segments comprising a combination of curved and/or angular shaped surfaces. When the container is in the position connected to the carrier frame the one ore more contact segments make up the complete container or receptacle that acts a holding device or reservoir for the food products during their transportation.

In one embodiment of a product holder according the present invention, the container comprises a plurality of cooperating contact segments detachably connectable to the carrier frame. The plural container segments may be successively placed in longitudinal direction and/or the container may be formed by a plurality of contact segments seen in cross section rectangular to the longitudinal direction through the container. Each contact segment may be coupled and disengaged from the carrier frame by for example pushing or pulling the curved contact segment. As the containers may in practice be relatively long (lengths of up to 2 meters are common practice), the container being an assembly of plural contact segments makes it easier to produce the container (segments) and also the transportation and storage of plural smaller container segments is facilitated (and thus cheaper) than the production, transportation and storage of relative large single pieced containers.

In an embodiment of the product holder according the present invention and applicable to all the embodiments described herein, the plural contact segments detachably attachable to the carrier frame have an identical shape (i.e. only one shape of segment is utilized). The identical shape of the contact segments make their production and stock control simpler. Also the assembly of the product holders is further simplified by using only a single type of contact segment. Preferably, all contact segments connected to the carrier frame are identical shaped segments wherein the segments are asymmetric having no internal mirror plane of symmetry. One of the advantages of asymmetric segments is that they enable the segments to be complementary in shape with each other without the result of discontinuations in the structure of the complete container when attached to the carrier structure.

In an embodiment of the product holder according the present invention, the container in a state connected to the carrier frame in cross section rectangular to the longitudinal direction through the container is substantially C-shaped. The C-shaped form of the container may be formed by one curved and/or angular shaped contact segment or an assembly of at least two cooperating curved and/or angular shaped contact segments. Such C-shape enables easy access to the container for the food products but also makes is possible to change the position of the food products relative to the container by rotating the container over an angle of about 180° along a longitudinal axis of rotation in case the container is transported through a processing room in a straight up- and downward movement. The C-shape also enables a compact construction of transportation devices moving a plurality of the product holders as well as that such C-shape enables to tip the product holders along the way during transport at different angles to treat the food products more evenly. Depending on the perimeter of the food product in relation of the perimeter of the contact surface, the rotation of the food product will differ from the rotation of the container. Therefore, the food product may rotate over an angle which is even larger than 360°. In the design choice of the container special care has to be taken that depending on the movement of the container and the size of the food product to be transported, the food product is moved such that it contacts the container at different positions (so there is less risk of marking of the food product arises and the processing of the food product is likely to be more even/equal over the perimeter of the food product). The contact segments of the product holder according the present invention may have an edge comprising a plurality of extending protuberances. Such protuberances may be in the form of a, preferably asymmetric, fingerlike structure but also in the form of a jagged edge. The protuberances may be oriented in any direction for instance in longitudinal direction of the product holder. The term "jagged edge" as used herein is defined to describe an edge being a dentate edge, notched edge, incised edge, toothed edge, serrated edge, cogged edge, zig-zag edge or the like. Preferably the protuberances provided are so shaped that they avoid straight grooves or straight openings in between opposite contact segments. Such straight grooves or straight openings could lead to undesired markings on the food products. Furthermore a point of special interest in the shape of the resulting seams or gaps between opposed contact segments is that they are shaped such as that they are easy to clean so to limit for instance bacterial growth.

In order to enable the process conditions from the processing room to act on the food product the contact segment may be provided with a plurality of apertures. The term "apertures" as used herein is defined to describe eyes, interstices, openings, orifices, perforations, pinholes, punctures, spaces, vents or the like. The apertures also prevent the undesired collection of fluids and gasses in the container. The apertures may be arranged in the form of a round, hexagonal, squared or diamond shaped pattern. A hexagonal shaped pattern is preferred providing a relatively more open structure without having sharp corners which may have a negative influence on the structure of the food product.

In order to minimize the contact of the container with the food product, the inner surface of the contact segment may comprise bumps, i.e. the bumps may be directed towards the food product. The term "bumps" as used herein is defined to describe knobs, bulges, buffers, swellings, lumps or the like. The less contact the food products make with the container the better the exterior of the food products may be subjected to the processing conditions.

In an embodiment of the product holder according the present invention, the contact segment is made of a material that is light, easy to clean and has no or minimal interaction with the food products. The material used may be any material suitable for holding food products in a hygienic way. Preferably, the material used is a polymer material including synthetic or semi-synthetic moldable material selected from a food grade polymer such as polyamide, poly-oxymethylene, polyethylene, polypropylene, polystyrene, polyvinyl chloride, polytetrafluoroethylene, and the like including combinations thereof.

In an embodiment of the product holder according the present invention, the contact segment is clamply connectable to the carrier frame, e.g. longitudinal support structure, so that it is removably snapped to the carrier frame, for instance. Thus, a snap or click system is provided which may be a self-locking system. Due to the container-carrier frame structure of the product holder of the present invention, no complex connecting means are necessary to connect the container to the carrier frame and the coupling/uncoupling can be done without the need of tools. It is also possible to add further connecting means—like bolts, screws, coupling pins and so on—to further secure the connection of the container to the carrier frame.

In an embodiment of the product holder according the present invention, the longitudinal support structure comprises at least one rod. The term "rod" as used herein is defined to describe a bar, pole, girder, beam or the like. The rod may be, but not necessarily, in the form of a (rounded) rectangular or (rounded) triangular beam optionally comprising fixation means, e.g. openings, whereon the one or more contact segment are detachably connected. The rod may be made of metal (e.g. steel), polymer material or the like. In order to reduce the weight of the longitudinal support structure, the rod may have a hollow structure. In case contact segments are connected to the rod making use of bolts, pop rivets, plugs or the like, a rod having a hollow structure is preferred. In an alternative embodiment the cavity formed by the hollow structure of the rod may be filled with resin and/or aluminum (in case steel is used).

In an embodiment of the invention the rod used for supporting the container made of one or more contact segments has a substantially C-shaped hollow structure at least partially enclosing the contact segments and therefore providing a secured detachable connection between the contact segments and the carrier frame. Preferably, the contact segments are made of relatively flexible material including polymers, such as plastics. The relatively flexible contact segments are snapped into a more rigid carrier frame, preferably made of metal, e.g. steel.

In an embodiment of the product holder according the present invention, the longitudinal support structure comprises more than one parallel rods, e.g. two or three parallel rods. In such case the longitudinal support structure further comprise coupling ends connected to opposite sites of the longitudinal support structure. Preferably, each contact segment is detachably connected to at least two parallel rods forming the longitudinal support structure. The rods make an open and light yet also stable support construction. Additionally, the use of a longitudinal support structure comprising more than one rod provides the possibility of positioning at least two parallel placed product holders on the same longitudinal support structure. The longitudinal support structure of the present invention comprising more than one rod is therefore able to provide different sizes of product holders, i.e. one product holder connected to at least two rods or at least two parallel placed product holders connected each to one rod, and may therefore be suitable for the manufacturing of different sizes of food products.

In an embodiment of the product holder according the present invention, the longitudinal support structure further comprises at least one coupling that is located between the coupling ends for connecting the parallel rods, in case the carrier frame comprises two or more parallel rods, as described above. Such a coupling may be a separating plate or construction stabilizing means for coupling the rods in order to enhance the stability of the construction. The coupling further enhances the stability of the support structure.

In another aspect the present invention provides a transporting device, for transporting food products to be subjected to a processing, comprising: a processing room for treating the food product; a plurality of product holders of the present invention as described above; and at least one drive for transporting the product holders along a route extending through the processing room, wherein the longitudinal support structure of the product holders comprises at least one coupling and wherein the coupling is connected to an advancing element that is driven by the drive. In the processing room the processing conditions can be created that are required for the food processing. Examples of such processes are drying, heating, cooling, smoking (by liquid and/of smoke), spraying, powdering so on. For the advantages of the transporting device reference is made to the advantages already mentioned in relation to the product holder according the present invention and are here also brought forward in relation to the transporting device by reference.

In an embodiment of the transporting device according the present invention, the advancing element may be in the form of a belt or chain. Preferably, the transporting device of the present invention comprises dual advancing elements connecting to the opposite sides of the longitudinal support structure comprising coupling ends provided with couplings. Even further preferred the product holder extends transversely of the direction of movement of the advancing element.

The present invention also provides a method for assembling and a method for disassembling a product holder. For assembling the method comprises the step of installing at least one contact segment by connecting the contact segment to the carrier frame. The contact segments may be snapped or clicked to the carrier frame manually. For disassembling the method comprises the step of removing at least one contact segment by disconnecting the contact segment from the carrier frame. Also the disconnection of contact segments may be done manually.

The present invention also provides the use of a transporting device as described above, for holding food products to be transported through a processing room. The advantage of the transporting device of the present invention is that the present invention enables the compacter construction of product holders. It is for instance possible to provide a more compact form containers thus resulting in an increase of capacity of the transporting device or a compacter construction of transporting devices when the capacity is not to be enhanced. Consequently, this may result in a more compact processing room or an increase of processing speed of the food products present in the processing room.

BRIEF DESCRIPTION OF THE DRAWINGS

The present invention is further elucidated on the basis of the non-limitative exemplary embodiment shown in the following figures. Herein.

DETAILED DESCRIPTION OF THE INVENTION

Figure 1:
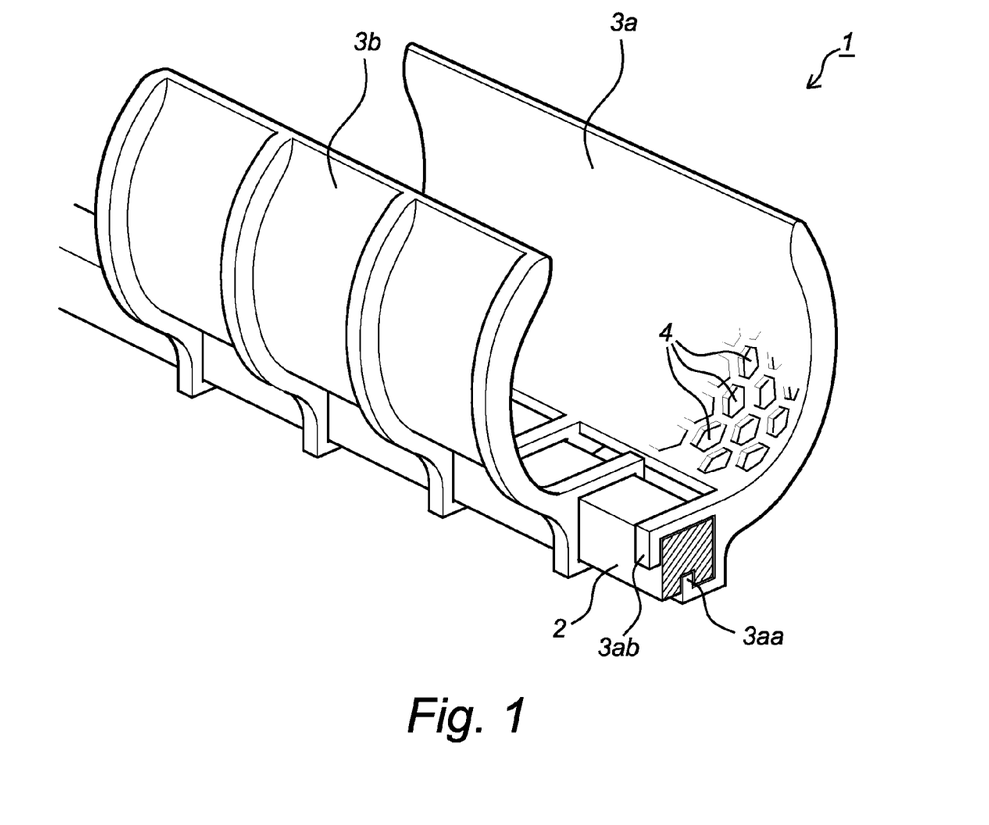
FIG. 1 shows a product holder of the present invention.
Figure 2:
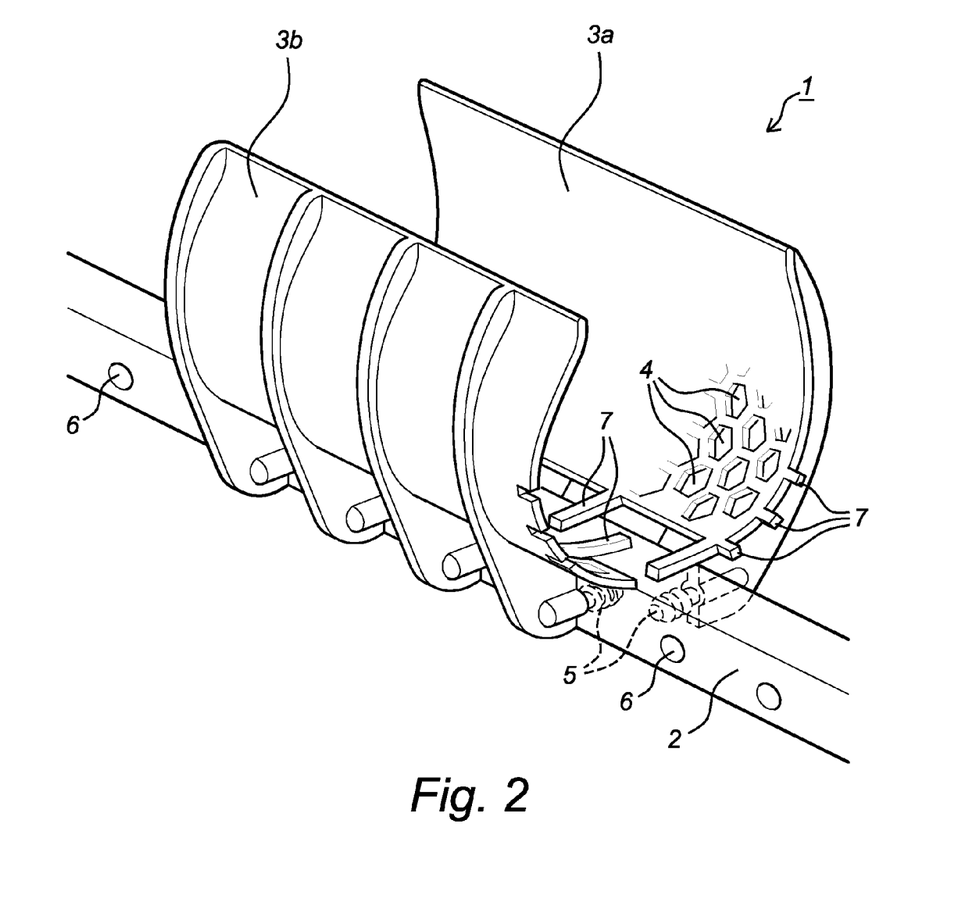
FIG. 2 shows an alternative product holder of the present invention.
Figure 5:
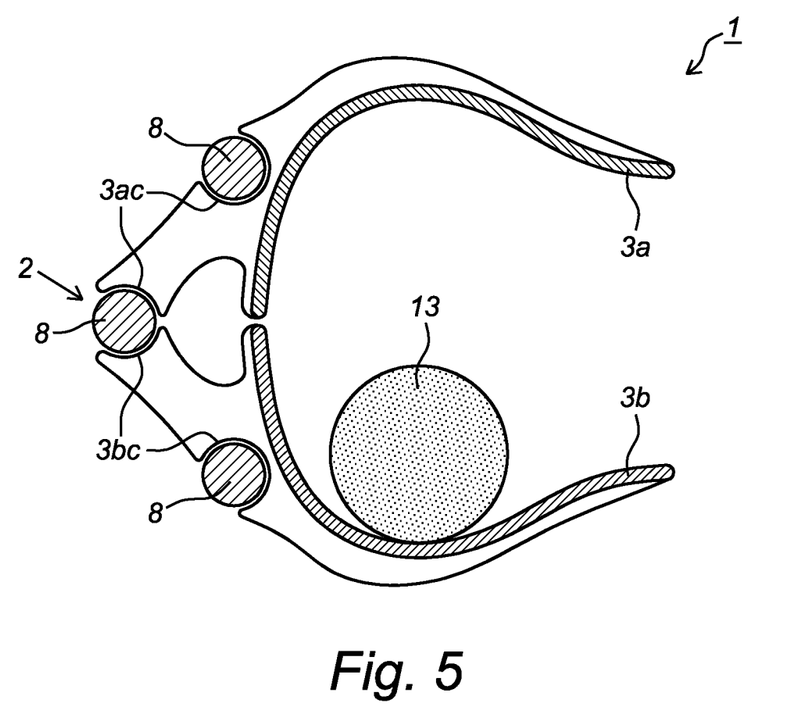
FIG. 5 shows a cross-section of the product holder of the present invention.

FIG. 1 shows a product holder 1 of the present invention comprising carrier frame 2 and detachably connected to the carrier frame 2 contact segments 3a, 3b. Contact segments 3a, 3b have cooperating shapes 3aa, 3ab releasably snapped to the carrier frame 2. The cooperating shapes may vary as well as the shape of the carrier frame 2 (see for example: FIGS. 2 and 5). The connection between contact segments 3a, 3b and carrier frame 2 may be further secured by using fixation means (not shown here). Contact segments 3a, 3b further comprise a plurality of apertures 4. The carrier frame 2 may further comprise couplings (not shown here) for coupling the product holder 1 to a transport device (not shown here).

FIG. 2 shows an alternative product holder 1 of the present invention comprising contact segments 3a, 3b releasable connected to carrier frame 2 by screw anchors 5 fitted in openings 6 created in carrier frame 2. Contact segments 3a, 3b further comprise a plurality of apertures 4 having a hexagonal structure. However, apertures 4 may also be in the form of circles or rectangles, for example. The product holder 1 is formed by two identical (asymmetric) contact segments 3a, 3b, however, it is also possible to form a product holder 1 by one contact segment (not shown here) attached to carrier frame 2 the one contact segment having the shape and form of the combination of the shown segments 3a and 3b. Furthermore, the edges of contact segments 3a, 3b have fingerlike structures 7. The fingerlike structures 7 of contact segment 3a cooperates with the fingerlike structures 7 of contact segment 3b. Additionally, the fingerlike structures 7 of contact segments 3a, 3b cooperate with optional neighboring contact segments (not shown here).

Figure 3:
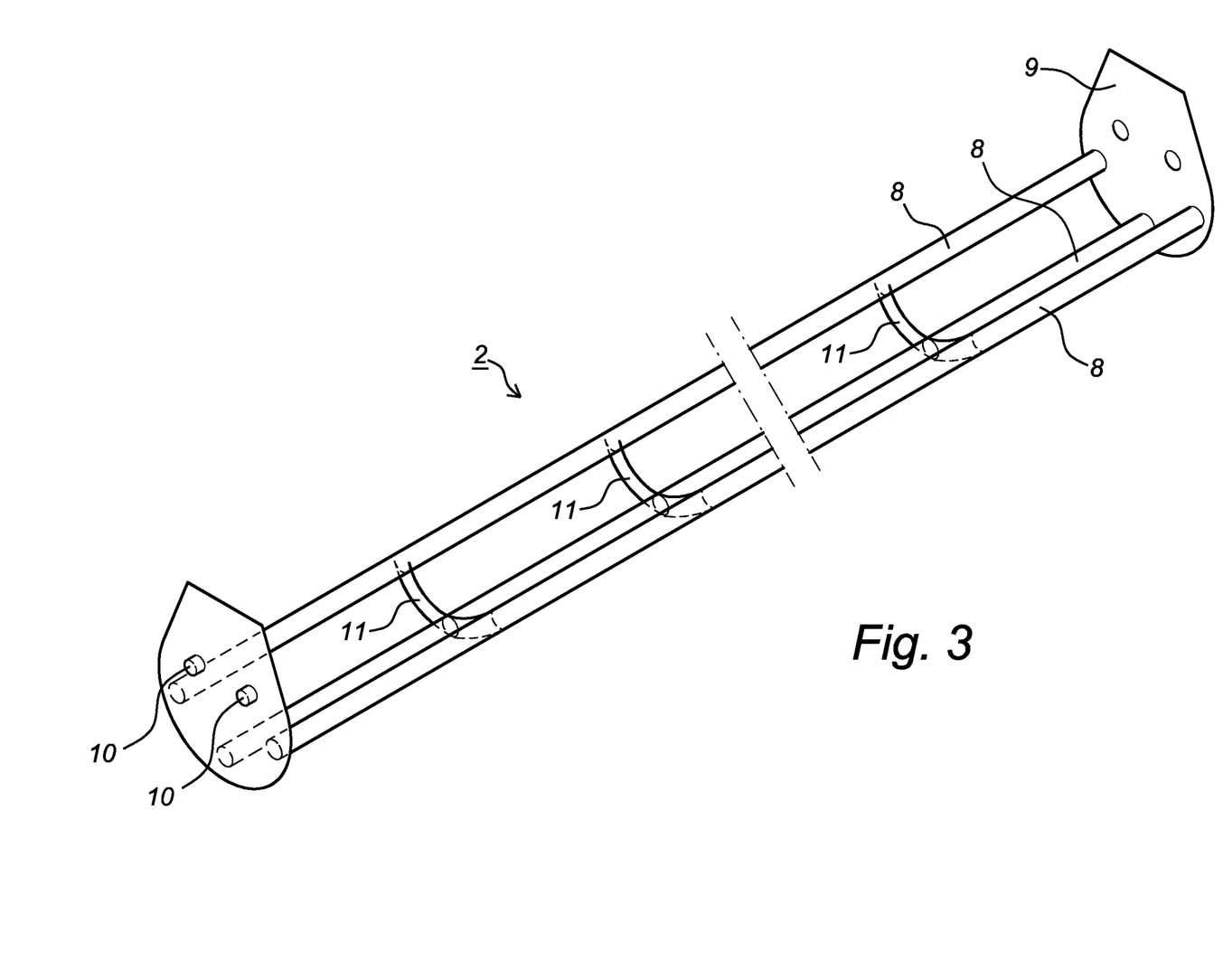
FIG. 3 shows a carrier frame of the present invention.

FIG. 3 shows a carrier frame 2 having a longitudinal support structure made of bars 8. The figure shows three separated bars 8; however, it is also possible to design a longitudinal support structure made of one single bar for carrying the container of the present invention. Additionally, it may be possible to design a product holder of the present invention wherein two bars 8 of the carrier frame 2 each of them supporting a separate container, i.e. two separate product holders placed in parallel. The carrier frame further comprises coupling ends 9 which secure the position of the bars 8 and furthermore may enable the connection of the carrier frame to a transport system that is not shown in this figure. However, couplings for connecting the carrier frame 2 to a transport system may be positioned anywhere on the carrier frame 2, e.g. in the middle of the carrier frame 2. In case coupling ends 9 are connected to the transport system, advancing element connectors 10 are part of the coupling ends 9 to provide means for the connection of the carrier frame 2 to an advancing element like for instance a chain. In order to enhance the stability of the longitudinal support structure connectors 11 may be placed in the carrier frame connecting the individual bars 8.

Figure 4:
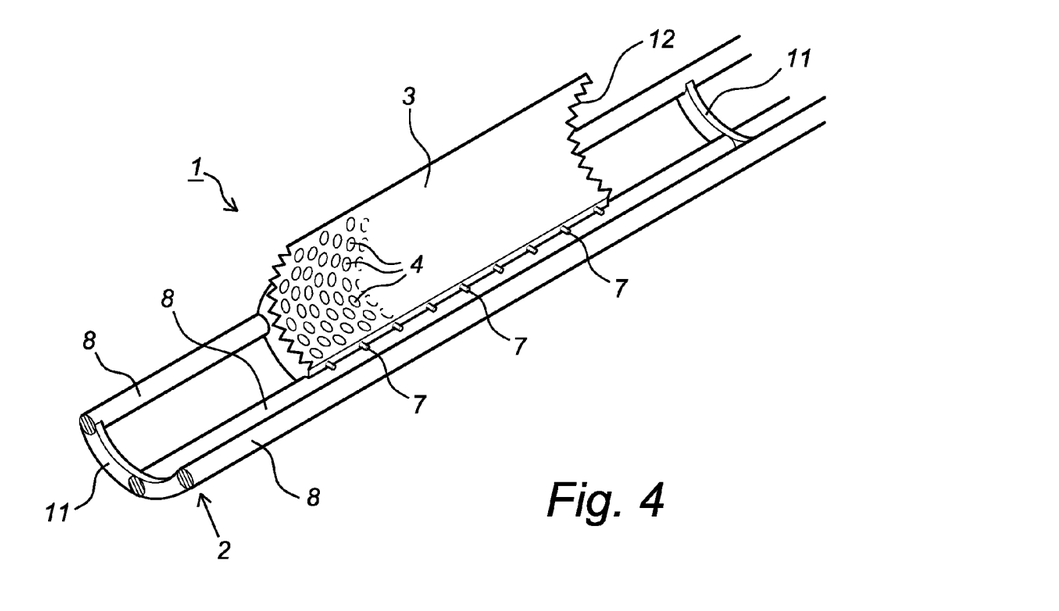
FIG. 4 shows the product holder of the present invention.

FIG. 4 shows a part of the product holder 1 of the present invention in a partly assembled situation. FIG. 4 shows a part of the carrier frame of FIG. 3, comprising the longitudinal support structure made of bars 8 and stabilizers 11. On the carrier frame 2 here only one contact segment 3 is detachably connected. The contact segment 3 is adapted to snap on the carrier frame 2. The contact segment 3 is provided with openings 4 to allow environmental conditions on the food products carried by the contact segment 3. The openings 4 may be in the form of round openings, but may have any structure suitable for holding the food product and that allow fluids and/or gasses to pass. The opening may for instance also have a honeycomb structure (not shown here). Additionally, the contact segment 3 has a fingerlike structure 7 to cooperating with adjoining contact segments (not shown here). Contact segment 3 also comprises another edge having a zig-zag formed edge 12.

FIG. 5 shows a cross-section through the product holder 1 as partially shown in FIG. 4. The cross section through the product holder 1 shows two contact segments 3a, 3b that are detachably connected by a snap coupling 3ac, 3bc to the rods 8 of the carrier frame 2. A food product 13, e.g. a sausage, is positioned in such a way that the product 13 is able to rotate around its longitudinal axis. The, in cross section, C-shaped form of the product holder 1 prevents the food product to fall out of the product holder 1.

Figure 6:
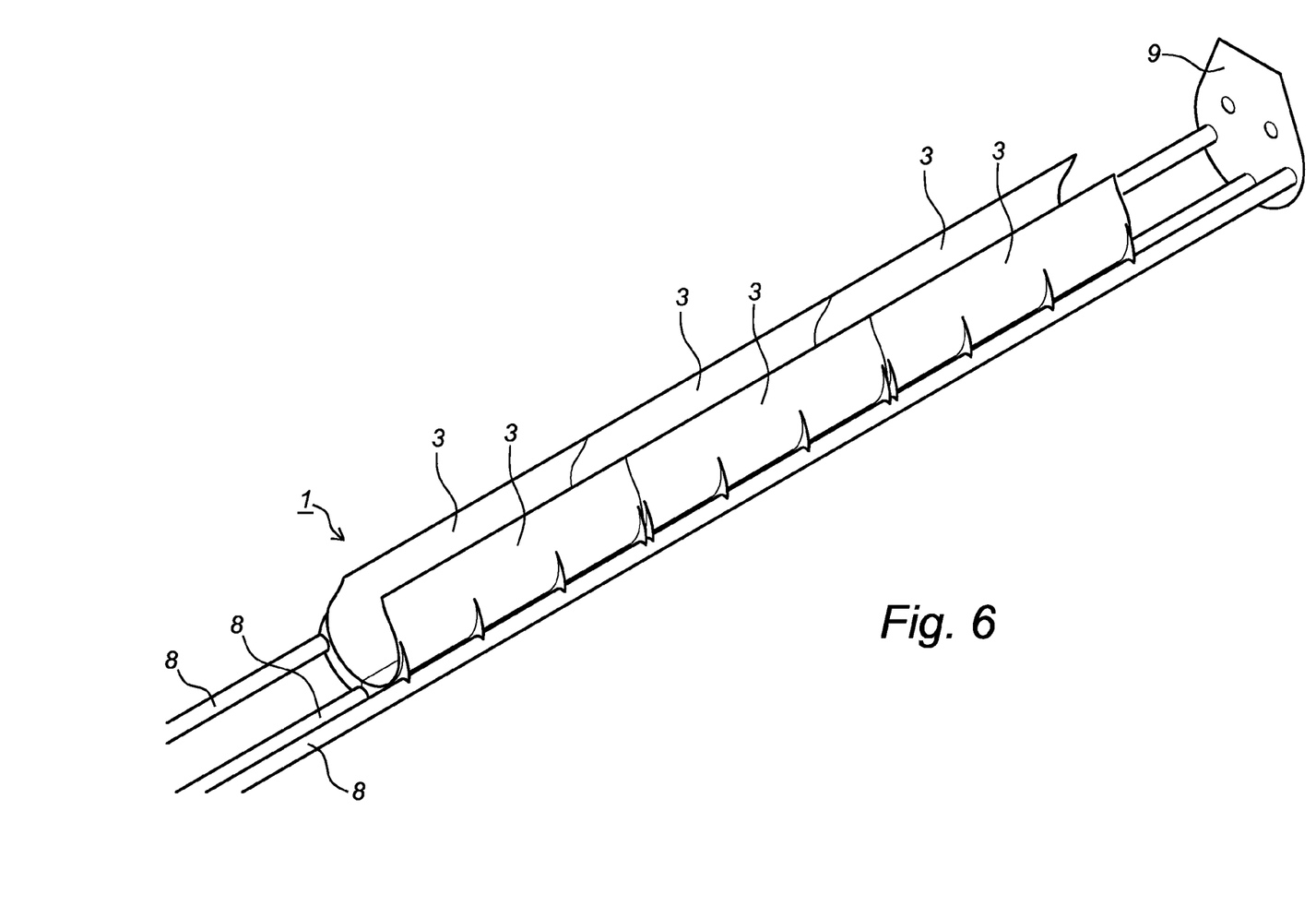
FIG. 6 shows the product holder of the present invention comprising a plurality of contact segments.

FIG. 6 shows an alternative of the product holder 1 comprising a plurality of curved contact segments 3 connected to a carrier frame comprising rods 8 and coupling ends 9. The curved contact segments 3 are here positioned successively in longitudinal direction.

Figure 7:
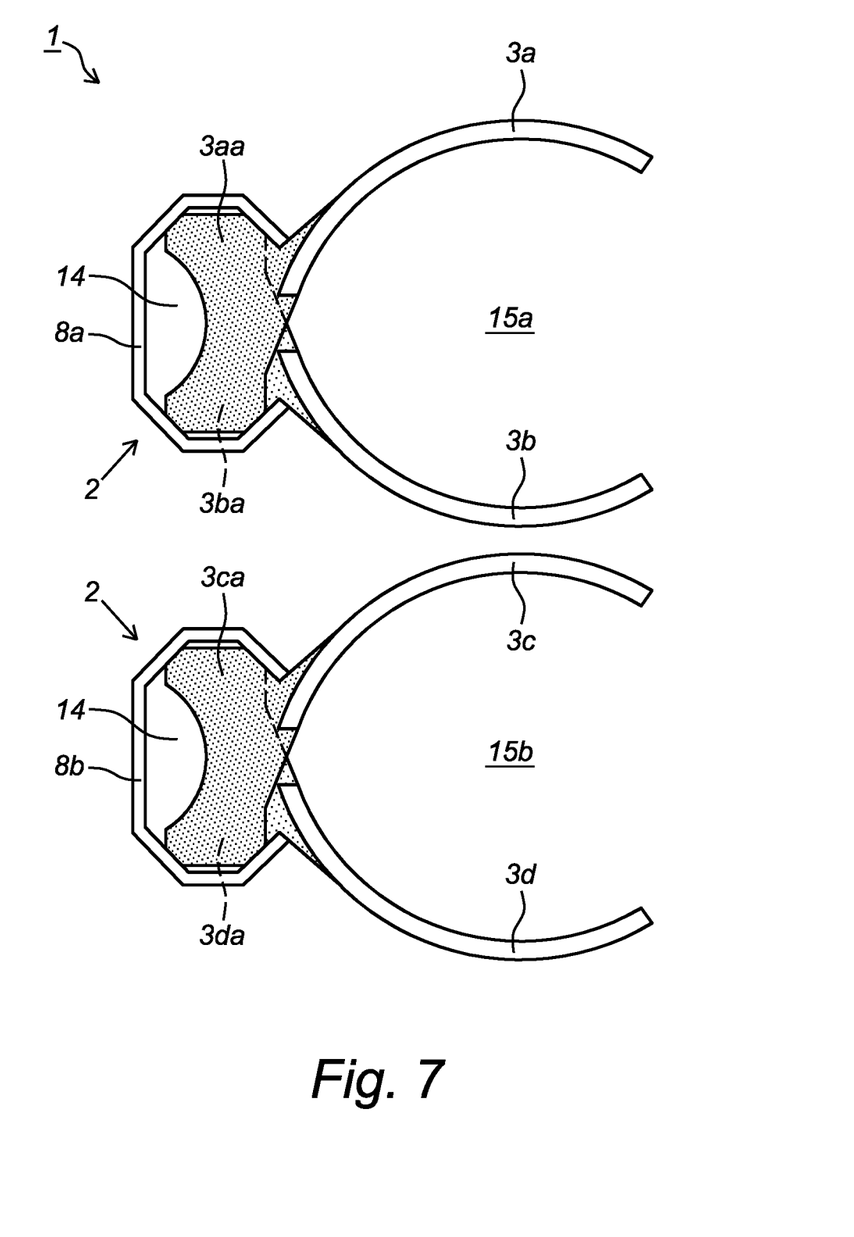
FIG. 7 shows a cross-section of the product holder of the present invention.

FIG. 7 shows a cross-section of the product holder 1, wherein carrier frame 2 comprises two bars 8a, 8b having a substantially C-shaped hollow form partially enclosing several contact segments 3a, 3b, 3c, 3d. Both bars 8a, 8b are connected by coupling ends (not shown here) to form one longitudinal support structure 2. Longitudinal support structure, e.g. carrier frame 2, may further comprise one or more couplings to connect the carrier frame 2 to an advancing element, e.g. a chain, of a transporting device (not shown here). Each contact segment 3a, 3b, 3c, 3d is detachably connected to the carrier frame 2 by clicking a part 3aa, 3bq, 3ca, 3da of the contact segment 3a, 3b, 3c, 3d into the cavity 14 formed by the bars 8a, 8b. Furthermore, the carrier frame 2, e.g. bars 8a, 8b, supports two containers 15a, 15b formed by respectively contact segments 3a, 3b and contact segments 3c, 3d. Therefore, product holder 1 comprises two parallel placed containers 15a, 15b formed by contact segments 3a, 3b and 3c, 3d respectively supported by a single carrier frame 2.

The invention claimed is:

1. A product holder, for holding food products to be transported through a processing room, comprising:
   a carrier frame comprising at least a longitudinal support structure, and at least one coupling connected to the longitudinal support structure; and
   a container comprising at least two separate contact segments for contacting the food products,
   wherein each contact segment is detachably connectable to the carrier frame.

2. The product holder as claimed in claim 1, wherein the container comprises a plurality of successively in a longitudinal direction cooperating contact segments, each of the plural contact segments detachably connectable to the carrier frame.

3. The product holder as claimed in claim 1, wherein in a cross section perpendicular to the longitudinal direction through the container, the container comprises a plurality of contact segments, each of the plural contact segments detachably connectable to the carrier frame.

4. The product holder as claimed in claim 1, wherein plural contact segments detachable to the carrier frame have an identical shape.

5. The product holder as claimed in claim 1, wherein the container in a state connected to the carrier frame in cross section perpendicular to the longitudinal direction through the container is substantially C-shaped.

6. The product holder as claimed in claim 1, wherein the contact segment has at least one edge comprising a plurality of extending protuberances.

7. The product holder as claimed in claim 1, wherein the contact segment is provided with a plurality of apertures.

8. The product holder as claimed in claim 1, wherein the inner surface of the curved contact segment comprises bumps wherein the bumps are directed towards the food product.

9. The product holder as claimed in claim 1, wherein the curved contact segment is made of a polymer material.

10. The product holder as claimed in claim 1, wherein the curved contact segment is releasably clampingly connectable to the carrier frame.

11. The product holder as claimed in claim 1, wherein the longitudinal support structure comprises at least one or more parallel rods.

12. The product holder as claimed in claim 11, wherein the longitudinal support structure comprises at least two or more parallel rods and coupling ends connected to opposite sites of the longitudinal support structure for connecting the parallel rods.

13. A transporting device, for transporting food products to be subjected to a processing, comprising:
   a processing room for treating the food product;
   a plurality of product holders as claimed in claim 1; and
   at least one drive for transporting the product holders along a route extending through the processing room,
   wherein coupling ends of the product holders are connected to an advancing element that is driven by the drive.

14. A method for assembling a product holder according to claim 1, comprising the step of installing at least one curved contact segment by connecting the curved contact segment to a carrier frame.

15. A method for disassembling a product holder according to claim 1, comprising the step of removing at least one curved contact segment by disconnecting the curved contact segment from a carrier frame.

\* \* \* \* \*